United States Patent Office
3,410,907
Patented Nov. 12, 1968

3,410,907
CYCLOPENTANOPHENANTHRENE
DERIVATIVES AND PROCESS
John A. Edwards, Palo Alto, Calif., assignor to Syntex Corporation, Panama, Panama, a corporation of Panama
No Drawing. Filed Aug. 4, 1965, Ser. No. 477,319
20 Claims. (Cl. 260—586)

ABSTRACT OF THE DISCLOSURE

Novel B - homo-19-nor-$\Delta^4$ and $\Delta^{5(10)}$-androsten-3β-ol steriods which are, inter alia, anabolic and progestational agents and processes for the preparation of such compounds.

---

This invention relates to novel cyclopentanopolyhydrophenanthrene derivatives and to processes for the preparation thereof.

More particularly, this invention relates to novel B-homo-19-nor-$\Delta^4$ and $\Delta^{5(10)}$-androsten-3β-ols and 3-esters and ethers thereof represented by the general formula:

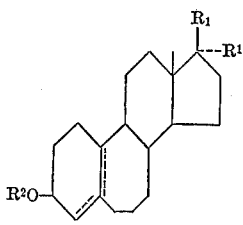

In the above formula, R represents a hydroxy group, an acyloxy group, a tetrahydrofuranyloxy group or a tetrahydropyranyloxy group, $R^1$ represents hydrogen, a lower alkyl (including cycloalkyl) group, such as methyl, ethyl, propyl, cyclopropyl, butyl, cyclobutyl, and the like, a lower alkenyl group, such as vinyl and the like, or a lower alkynyl (including halo-lower alkynyl) group, such as ethynyl, fluoroethynyl, chloroethynyl, bromoethynyl, propynyl, trifluoropropynyl, butynyl, hexynyl, and the like; R and $R^1$ taken together may represent a keto group; $R^2$ represents hydrogen, an acyl group, a tetrahydrofuranyl group or a tetrahydropyranyl group, and the dotted lines indicate that there is one double bond at either the 4(5)- or the 5(10)-position.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel B-homo steriods represents by the above formula wherein $R^1$ is other than alkynyl are anabolic agents with a favorable anabolic-androgenic ratio. They also have antiestrogenic, antigonadotrophic and antifibrillatory properties, lower blood cholesterol levels, and suppress the output of the pituitary gland.

The novel B-homo steroids described above wherein $R^1$ represents a lower alkynyl group are progestational agents having antiandrogenic, antiestrogenic, antigonadotrophic and diuretic properties. In addition, they can be used in fertility control, in the treatment of premenstrual tension, and in lowering blood cholesterol levels.

The novel B - homo-19-nor-$\Delta^{5(10)}$-androsten-3β-ols, 3-ethers and esters thereof of the present invention may be prepared by a process illustrated in the following equation:

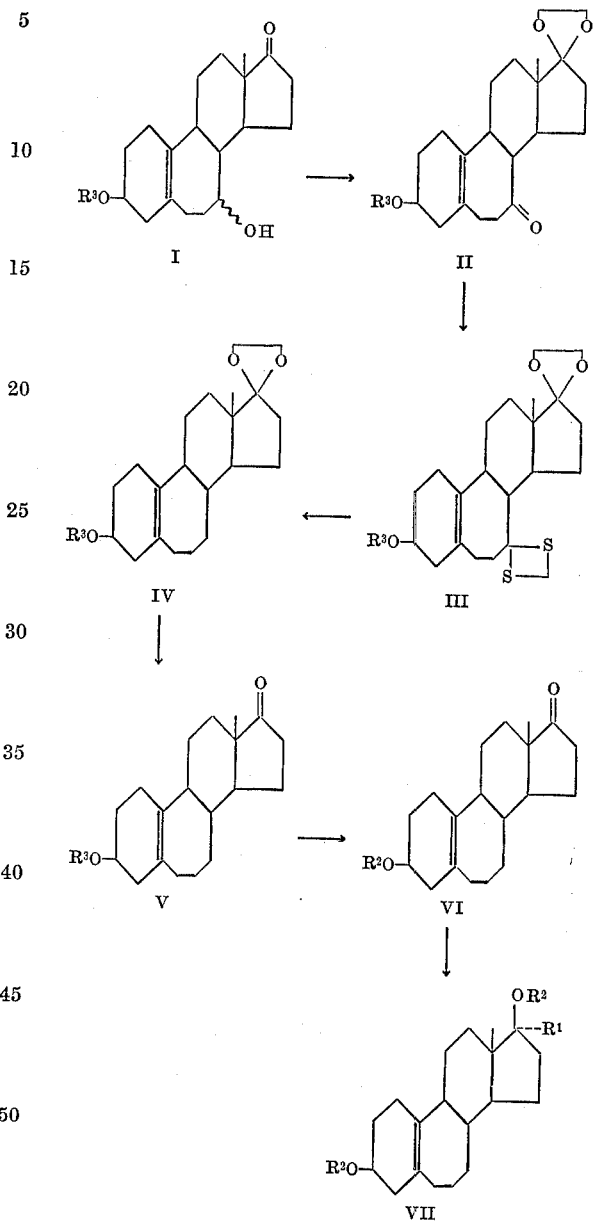

In the above formulas $R^1$ and $R^2$ have the same meanings as previously described and $R^3$ represents an acyl group.

In practicing the process outlined above, the starting material I, a B-homo-19-nor-$\Delta^{5(10)}$-androstene-3β,7(α or β)-diol-17-one 3-acylate, such as, B-homo-19-nor-$\Delta^{5(10)}$-androstene-3β,7β-diol-17-one 3-acetate (I; $R^3$=acetyl, obtained as described in my copending U.S. patent application Ser. No. 423,566, filed Jan. 5, 1965, now abandoned, is ketalized in a known manner with a lower alkylene glycol, such as ethylene glycol, propylene glycol, or the like, to give the corresponding 17-ketal, that is, B-homo-17 - cycloethylenedioxy - 19-nor-$\Delta^{5(10)}$androstene-3β,7β-diol 3-acetate. The 7-hydroxy group of the resulting 17-ketal is then oxidized, using chromium trioxide in pyridine, or the like, preferably at room temperature overnight, to give the corresponding 7-keto steroid, B-homo- 17 - cycloethylenedioxy-19-nor-Δ⁵⁽¹⁰⁾-androstene-3β-ol-7-one 3-acetate (II; R³=acetyl).

The latter compound is then reacted with a lower alkylene dithiol, such as ethanediol, propanedithiol, or the like, to give the corresponding 7-cycloalkylene dithioketal, that is, B-homo-17-cycloethylenedioxy-7-cycloethylenedithio-19-nor-Δ⁵⁽¹⁰⁾-androsten-3β-ol 3-acetate (III; R³=acetyl). The latter derivative is then selectively hydrogenolyzed as by refluxing with Raney nickel in a solvent such as a lower alkanol from about 8 to about 24 hours, to form the corresponding 7-desoxy steroid, B-homo - 17-cycloethylenedioxy-19-nor-Δ⁵⁽¹⁰⁾-androsten-3β-ol 3-acetate (IV; R³=acetyl).

Removal of the protective cyclic ketal moiety from the foregoing compound as by refluxing in an inert organic solvent, preferably a ketone such as acetone, methylethyl ketone, methyl isobutyl ketone, or the like, with a strong acid, such as sulfuric acid, hydrochloric acid, p-toluenesulfonic acid, or the like, affords the corresponding 17-keto steroid, B-homo-19-nor-Δ⁵⁽¹⁰⁾-androsten-3β-ol-17-one 3-acetate (V; R³=acetyl).

Conventional saponification of the latter compound furnishes the corresponding free alcohol (VI; R²=hydrogen).

The 3β-hydroxy compound may be reesterified by conventional means to form esters other than the acetate by treatment with a different acylating agent derived from a hydrocarbon carboxylic acid of less than 12 carbon atoms of the type described previously.

Reaction of the free 3β-hydroxy compound with dihydrofuran or dihydropyran in benzene, under substantially anhydrous conditions, in the presence of a small amount of an acid catalyst, such as, p-toluenesulfonic acid, boron trifluoride etherate, or the like, preferably from about room temperature to about 50° C., from about 1 to about 72 hours, gives the corresponding 3-tetrahydrofuranyl or tetrahydropyranyl ether.

By reacting the free 3β-ol-17-one or a 3-ester or ether thereof, dissolved in an aqueous ether solution, such as, an aqueous dioxane or tetrahydrofuran solution containing from about 10% to about 20% water, or the like, with a double metal hydride, such as lithium aluminum hydride, sodium borohydride, and the like, preferably the latter, at a temperature ranging from room temperature to reflux temperature for about 1 hour to about 24 hours, the corresponding 3β,17β-diol or 3-ester or ether thereof, that is, B-homo-19-nor-Δ⁵⁽¹⁰⁾-androstene-3β,17β-diol (VII; R¹ and R²=hydrogen), is obtained.

Reaction of the free 3β-ol-17-one or a 3-ester or ether thereof, dissolved in an inert organic solvent, preferably thiophene-free benzene, at reflux temperature under substantially anhydrous conditions for about 3 hours or longer, with a lower alkyl, alkenyl or alkynyl magnesium halide, such as methyl, vinyl or ethynyl magnesium bromide, or the like, produces the corresponding 17α-lower alkyl, -lower alkenyl or lower alkynyl-17β-hydroxy derivative (VII; R¹=lower alkyl, alkenyl or alkynyl, R²=hydrogen).

Where necessary, these 17α-substituted and -unsubstituted 17β-ols can then be reesterified or reetherified at the 3-position, or esterified or etherified at the 1-position, using conventional techniques, i.e., those mentioned hereinabove in the case of 3-esters and 3- or 17-ethers and 3,17-bis-ethers, or by reaction at room temperature with a mixture of the appropriate acid anhydride and the corresponding acid, in the presence of a catalytic amount of p-toluenesulfonic acid and under substantially anhydrous conditions, in the case of 17-esters and 3,17-diesters.

Similarly, a lower alkyl, alkenyl or alkynyl lithium compound, such as ethyl lithium, vinyl lithium, ethynyl lithium, or the like, in absolute diethyl ether and under an inert nitrogen atmosphere, can be used to convert the free 3β-ol-17-one, by reaction at room temperature for 48 hours or longer, to the corresponding 17α-lower alkyl, -lower alkenyl or -lower alkynyl-17β-hydroxy derivative.

The 17-one, dissolved in anhydrous benzene containing potassium t-amylate, can also be reacted with gaseous acetylene under an inert nitrogen atmosphere for 36 hours or longer at room temperature to give the corresponding 17α-ethynyl-17β-hydroxy derivative. Hydrogenation of this compound by known methods gives the corresponding 17α-vinyl or 17α-ethyl derivative.

Finally, 17α-haloalkynyl substituents can be introduced by first slowly mixing a polyhaloalkene of the general formula:

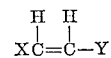

wherein X represents chloro or bromo and Y represents fluoro, chloro, bromo or fluoro-lower alkyl, e.g., trifluoromethyl, such as 1-chloro-2-fluoroethylene; 1,2-dichloroethylene; 1,2-dibromoethylene; 1-chloro-3,3,3-trifluoropropyl-1-ene; 1-bromo-3,3,3-trifluoropropyl-1-ene, or the like, in anhydrous diethylether under an inert nitrogen atmosphere at 0° C., with a solution of methyl lithium in anhydrous diethyl ether (prepared, for example, by adding lithium to methyl iodide in anhydrous diethyl ether solution under an inert nitrogen atmosphere at about 10° C.). This mixture is then held at room temperature, with stirring, for from about 90 minutes to about 2 hours, following which the 3β-ol-17-one dissolved in anhydrous diethyl ether, is slowly added and the resulting reaction mixture is held at room temperature for from about 12 hours to about 18 hours to give the corresponding 17α-haloalkynyl derivative. Where 1-chloro-2-fluoroethylene; 1,2-dichloroethylene, 1,2-dibromoethylene and 1-chloro-3,3,3-trifluoropropyl-1-ene, respectively, are used, a 17α-fluoroethynyl, 17α-chloroethynyl, 17α-bromoethynyl and 17α-trifluoropropynyl substituent, respectively, is obtained.

The novel B-homo-19-nor-Δ⁴-androsten-3β-ols, 3-esters and -ethers thereof hereinabove described are prepared by a process illustrated by the following equation

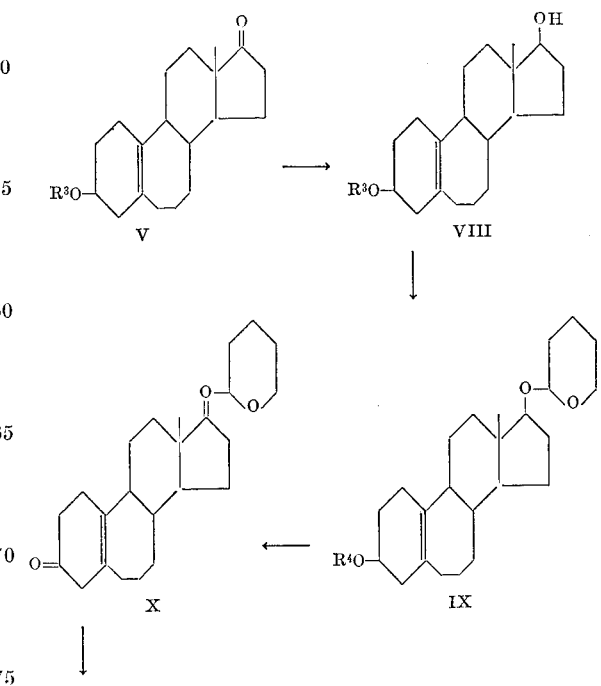

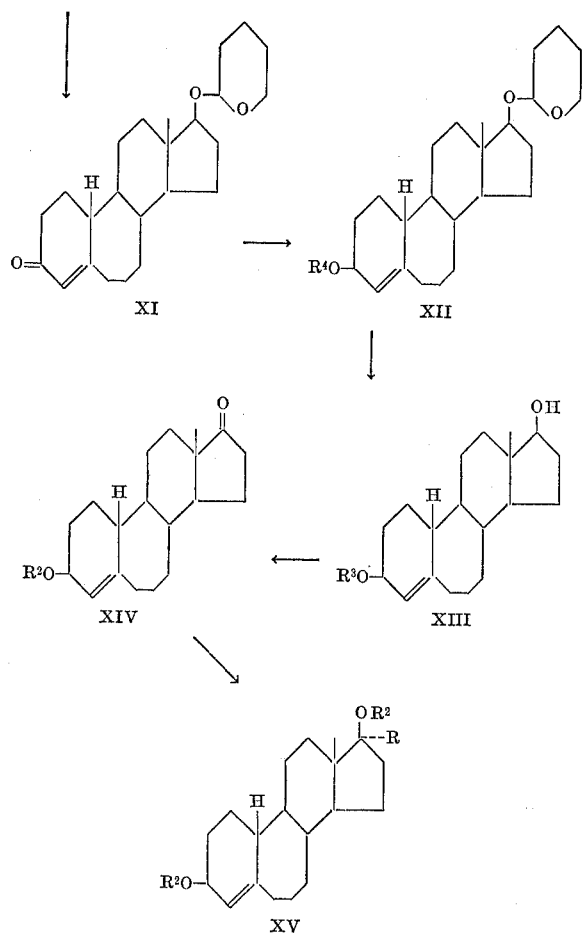

In the above formulas $R^1$, $R^2$ and $R^3$ have the same meanings as set forth hereinabove and $R^4$ represents hydrogen or acyl.

In carrying out the above process, the starting material V, a B-homo-19-nor-$\Delta^{5(10)}$-androsten-3β-ol-17-one 3-acylate, for example B-homo-19-nor-$\Delta^{5(10)}$-androsten-3β-ol-17-one 3-acetate (V; $R^3$=acetyl), dissolved in an aqueous ether solution, is reacted with a double metal hydride in the manner described hereinabove to provide the corresponding 17β-ol, e.g., B-homo-19-nor-$\Delta^{5(10)}$-androstene-3β,17β-diol 3-acetate, (VIII; $R^3$=acetyl).

The free 17β-hydroxy group in this 17β-ol is then etherified with dihydropyran, in the manner described hereinabove, to give the corresponding 17β-tetrahydropyranyloxy derivative, e.g., B-homo-19-nor-17β-tetrahydropyranyloxy-$\Delta^{5(10)}$-androsten-3β-ol 3-acetate (IX; $R^4$=acetyl) which upon hydrolysis in the manner described hereinabove, affords the corresponding free 3β-hydroxy steroid, B-homo-19-nor - 17β - tetrahydropyranyloxy-$\Delta^{5(10)}$-androsten-3β-ol (IX; $R^4$=hydrogen). Oxidation of the thus-obtained 3β-hydroxy steroid with chromium trioxide in pyridine, preferably at room temperature overnight, gives B - homo - 19-nor-17β-tetrahydropyranyloxy-$\Delta^{5(10)}$-androsten-3-one (X) which upon refluxing with an aqueous methanolic solution of sodium hydroxide, potassium hydroxide, or the like, preferably of from about 0.01 N to about 0.1 N, under an inert nitrogen atmosphere for from about one to about six hours, to give the corresponding 19-nor-$\Delta^4$-3-one, B-homo-19-nor-17β-tetrahydropyranyloxy-$\Delta^4$-androsten-3-one (XI).

Upon refluxing the thus-obtained 19-nor-$\Delta^4$-3-one with lithium aluminum hydride in tetrahydrofuran, under substantially anhydrous conditions, there is obtained the corresponding 19-nor-$\Delta^4$-3β-ol, B-homo-19-nor-17β-tetrahydropyranyloxy - $\Delta^4$ - androsten-3β-ol (XII; $R^4$=hydrogen), which, upon esterification in the manner described hereinabove, affords the corresponding 3-acylate, B-homo-19 - nor - 17β-tetrahydropyranyloxy-$\Delta^4$-androsten-3β-ol 3-acylate (XII; $R^4$=acyl).

The thus-obtained 3-acylate, dissolved in aqueous lower alkanol, such as methanol, ethanol, or the like, is then reacted with oxalic acid at a temperature ranging from about room temperature to reflux temperature for about 10 minutes to about 2 hours or longer to remove the tetrahydropyranyl group, thus giving the corresponding free 17β-hydroxy 3-acylate, e.g., B-homo-19-nor-$\Delta^4$-androstene-3β,17β-diol 3-acylate (XIII; $R^3$=acyl). Upon oxidation of the latter compound with chromium trioxide in pyridine in the manner described hereinabove, there is obtained the corresponding 17-one, e.g., B-homo-19-nor-$\Delta^4$-androsten-3β-ol-17-one 3-acylate (XVI; $R^2$=acyl).

The introduction of 17α-substituents, 3- and 17-ester and ether groups, and the like, to give the various compounds encompassed by Formulas XIV and XV, can be accomplished in the manner described hereinabove for the corresponding 19-nor-$\Delta^{5(10)}$-compounds of Formulas VI and VII.

In order that those skilled in the art can more fully understand the present invention, the following examples are set forth. These examples are given solely for the purpose of illustrating the invention, and should not be considered as expressing limitations unless so set forth in the appended claims.

EXAMPLE I

A mixture of 1 gram of B-homo-19-nor-$\Delta^{5(10)}$-androstene-3β,7β-diol-17-one 3-acetate (1; $R^3$=acetyl), 25 cc. of anhydrous, thiophene-free benzene, 5 cc. of ethylene glycol and 50 mg. of p-toluenesulfonic acid monohydrate was refluxed for 16 hours with distillation of the water formed during the reaction. Following this reaction period the reaction mixture was washed with an aqueous sodium bicarbonate solution, then with water, then dried over anhydrous sodium sulfate, and finally evaporated to dryness. Recrystallization from acetone/hexane gave B-homo-17-cycloethylenedioxy-19-nor-$\Delta^{5(10)}$-androstene - 3β, 7β-diol 3-acetate.

EXAMPLE II

A solution of 6 grams of B-homo-17-cycloethylenedioxy-19-nor-$\Delta^{5(10)}$-androstene-3β,7β-diol 3-acetate in 120 cc. of pyridine was added to a mixture of 6 grams of chromium trioxide in 120 cc. of pyridine, and the resulting reaction mixture was then allowed to stand at room temperature (25° C.) overnight. Following this reaction period the reaction mixture was diluted with ethyl acetate and then filtered through Celite. The resulting filtrate was washed thoroughly with water, then dried over anhydrous sodium sulfate and evaporated to dryness. Crystallization from acetone/hexane gave B-homo-17-cycloethylenedioxy-19-nor-$\Delta^{5(10)}$-androsten-3β-ol-7-one 3-acetate.

EXAMPLE III

A solution of 5 grams of B-homo-17-cycloethylenedioxy-19-nor-$\Delta^{5(10)}$-androsten-3β-ol-7-one 3-acetate in 100 cc. of glacial acetic acid containing 5 cc. of ethanedithiol was admixed with 4 cc. of a saturated solution of hydrogen chloride in acetic acid, and the resulting reaction mixture was then allowed to stand at room temperature for 4 hours. Following this reaction period the reaction mixture was admixed with water and then saturated with ethyl acetate. The resulting extract was washed with an aqueous 5% sodium bicarbonate solution, then with water, then dried over anhydrous sodium sulfate and finally evaporated to dryness. Recrystallization from diethyl ether/hexane gave B-homo-7-cycloethylenedithio-17-cycloethylenedioxy-19-nor - $\Delta^{5(10)}$ - androsten-3β-ol 3-acetate.

EXAMPLE IV

A solution of 4 grams of B-homo-7-cycloethylenedithio-17-cycloethylenedioxy-19-nor-$\Delta^{5(10)}$-androsten - 3β- ol 3-acetate in 3 liters of ethanol (previously distilled from Raney nickel), containing 50 grams of Raney nickel, was refluxed for 6 hours. Following this reaction period the reaction mixture was filtered to remove the Raney nickel, which was then washed with hot ethanol and the washings added to the filtrate. The combined ethanol solution was then evaporated to dryness, and the resulting residue was dissolved in chloroform. This chloroform solution was washed with dilute hydrochloric acid, then with aqueous sodium carbonate solution and finally with water. The solution was then dried over anhydrous sodium sulfate and evaporated to dryness. Crystallization of the thus-obtained residue from acetone/hexane gave B-homo-17-cycloethylenedioxy-19-nor - $\Delta^{5(10)}$ - androsten-3β-ol 3-acetate.

EXAMPLE V

A solution of 2 grams of B-homo-17-cyclotheylenedioxy-19-nor-$\Delta^{5(10)}$-androsten-3β-ol 3-acetate in 70 cc. of methanol containing 7 ml. of aqueous 8% sulfuric acid was refluxed for 10 minutes. Following this reaction period the reaction mixture was neutralized by the addition of aqueous sodium carbonate solution, then concentrated to a volume of about 20 ml. under vacuum and poured into water. The thus-formed precipitate was then collected by filtration and washed thoroughly with water. Recrystallization from acetone gave B-homo-19-nor-$\Delta^{5(10)}$-androsten-3β-ol-17-one 3-acetate.

EXAMPLE VI

A solution of 1 gram of B-homo-19-nor-$\Delta^{5(10)}$-androsten-3β-ol-17-one 3-acetate in 50 cc. of methanol was refluxed for 3 hours with 500 mg. of potassium hydroxide dissolved in 1 cc. of water. Following this reaction period the reaction mixture was poured into ice water and the resulting precipitate collected by filtration, washed with water until neutral and then dried. Recrystallization from methylene dichloride/diethyl ether gave B-homo-19-nor-$\Delta^{5(10)}$-androsten-3β-ol-17-one.

EXAMPLE VII

A solution of 1 gram of sodium borohydride in 15 cc. of water was added to a solution of 1 gram of B-homo-19-nor-$\Delta^{5(10)}$-androsten-3β-ol-17-one in 120 cc. of tetrahydrofuran, and the resulting reaction mixture was then refluxed for 2 hours. Following this reaction period the reaction mixture was cooled to room temperature, treated with acetic acid to decompose excess borohydride, and then concentrated to a small volume under vacuum and diluted with water. The dilute solution was then extracted with ethyl acetate, and the resulting extract was washed with water, dried over anhydrous sodium sulfate and evaporated to dryness. Crystallization of the resulting residue from acetone/hexane gave B-homo-19-nor-$\Delta^{5(10)}$-androstene-3β,17β-diol.

EXAMPLE VIII

A solution of 5 grams of B-homo-19-nor-$\Delta^{5(10)}$-androsten-3β-ol-17-one in 250 cc. of thiophene-free benzene was admixed with 27.5 cc. of a 4 N solution of methylmagnesium bromide in diethyl ether, and the resulting reaction mixture was refluxed, excluding moisture, for 3 hours. Following this reaction period the reaction mixture was cooled to room temperature, then cautiously treated with an excess of an aqueous ammonium chloride solution, and then extracted with ethyl acetate. The resulting extract was washed with water, then dried over anhydrous sodium sulfate and evaporated to dryness. Recrystallization from methylene dichloride/hexane gave B-homo-17α-methyl-19-nor-$\Delta^{5(10)}$ - androstene - 3β,17β-diol.

EXAMPLE IX

A solution of 1 gram of B-homo-19-nor-$\Delta^{5(10)}$-androsten-3β-ol-17-one in 30 cc. of anhydrous, thiophene-free benzene was added, under an inert nitrogen atmosphere, to a solution prepared by dissolving 1.4 grams of potassium in 30 cc. of t-amyl alcohol, and a slow current of purified acetylene was then passed through the thus-prepared solution for 40 hours. Following this reaction period the reaction mixture was diluted with water and then extracted with benzene. The resulting extract was then washed with water until neutral, then dried over anhydrous sodium sulfate. Next, evaporation of the benzene and chromatography of the residue on alkaline alumina gave in the hexane/benzene (2:3 by volume, respectively) fractions a product which, upon recrystallization from acetone/hexane, gave pure B-homo-17α-ethynyl-19-nor-$\Delta^{5(10)}$-androstene-3β,17β-diol.

EXAMPLE X

A solution of 1 gram of B-homo-17α-ethylnyl-19-nor-$\Delta^{5(10)}$-androstene-3β,17β-diol in 40 cc. of pyridine containing 400 mg. of pre-hydrogenated 2% palladium-on-calcium carbonate hydrogenation catalyst was hydrogenated at room temperature and atmospheric pressure until 1.1 molar equivalents of hydrogen had been absorbed. At this point the reaction was stopped and the catalyst was removed by filtration through Celite, then washed with ethyl acetate. The washings were then added to the filtrate and the combined solution was evaporated to dryness under vacuum. The resulting residue was dissolved in ethyl acetate, and the thus-obtained solution was washed with dilute hydrochloric acid and then with water until neutral, dried over anhydrous sodium sulfate and evaporated to dryness. Recrystallization from acetone gave B-homo-19-nor-17α-vinyl-$\Delta^{5(10)}$-androstene - 3β,17β-diol.

EXAMPLE XI

A solution of 8.5 grams of 1-chloro-2-fluoroethylene in 50 cc. of anhydrous diethyl ether was added dropwise, with stirring, at 0° C. over a half hour period, to 15 cc. of a 1.4 N solution of methyl lithium in anhydrous diethyl ether, maintained under an inert nitrogen atmosphere, and this mixture was then held at room temperature, with stirring, for an additional 90 minutes.

Next, a solution of 0.5 gram of B-homo-19-nor-$\Delta^{5(10)}$-androsten-3β-ol-17-one in 20 cc. of anhydrous diethyl ether was added dropwise, with stirring, over a 15 minute period, following which the resulting reaction mixture was held at room temperature, with stirring, for 18 hours. Following this reaction period the reaction mixture was poured into ice water and then extracted with diethyl ether. The ether extract was then washed with water, dried over anhydrous sodium sulfate and concentrated under vacuum. Chromatography of the residue on basic alumina, using petroleum ether/diethyl ether (8:2, respectively, by volume) as the eluant, followed by crystallization from methanol, gave B-homo-17α-fluoroethynyl-19-nor-$\Delta^{5(10)}$-androstene-3β,17β-diol.

By repeating this procedure in every detail but one, namely, replacing 1-chloro-2-fluoroethylene with 1,2-dichloroethylene, 1,2-dibromoethylene and 1-chloro-3,3,3-trifluoropropyl-1-ene, respectively, the corresponding 17α-haloalkynyl derivatives, namely, B-homo-17α-chloroethynyl-19-nor-$\Delta^{5(10)}$-androstene - 3β,17β - diol; B-homo-17α-bromoethynyl-19-nor-$\Delta^{5(10)}$-androstene - 3β,17β - diol and B-homo-17α-trifluoropropynyl - 19 - nor-$\Delta^{5(10)}$-androstene-3β,17β-diol, respectively, were obtained.

EXAMPLE XII

A mixture of 1 gram of B-homo-19-nor-$\Delta^{5(10)}$-androsten-3β-ol-17-one, 8 cc. of pyridine and 4 cc. of acetic anhydride was allowed to stand at room temperature overnight. Following this reaction period the reaction mixture was poured into ice water and the resulting precipitate collected by filtration, washed with water and dried. Crystallization from acetone/hexane gave B-homo-19-nor-$\Delta^{5(10)}$-androsten-3β-ol-17-one 3-acetate, identical to that prepared as described in Example V hereinabove.

By repeating this procedure in every detail but one, namely, replacing B-homo-19-nor-$\Delta^{5(10)}$-androsten-3β-ol-17-one with:

B-homo-19-nor-$\Delta^{5(10)}$-androstene-3β,17β-diol;
B-homo-17α-methyl-19-nor-$\Delta^{5(10)}$-androstene-3β,17β-diol;
B-homo-19-nor-17α-vinyl-$\Delta^{5(10)}$-androstene-3β,17β-diol;
B-homo-17α-ethynyl-19-nor-$\Delta^{5(10)}$-androstene-3β,17β-diol;
B-homo-17α-fluoroethynyl-19-nor-$\Delta^{5(10)}$-androstene-3β,17β-diol;
B-homo-17α-chloroethynyl-19-nor-$\Delta^{5(10)}$-androstene-3β,17β-diol;
B-homo-17α-bromoethynyl-19-nor-$\Delta^{5(10)}$-androstene-3β,17β-diol, and
B-homo-17α-trifluoropropynyl-19-nor-$\Delta^{5(10)}$-androstene-3β,17β-diol, respectively, the corresponding 3-acetates (and, in the case of B-homo-19-nor-$\Delta^{5(10)}$-androstene-3β,17β-diol, the corresponding 3,17-diacetate) were obtained.

Similarly, by replacing acetic anhydride with propionic anhydride, cyclopentylpropionic anhydride, β-chloropropionic anhydride, butyric anhydride, caproic anhydride and enanthic anhydride, respectively, and using in turn each of the nine B-homo steroids mentioned above, the corresponding propionates, cyclopentylpropionates, β-chloropropionates, butyrates, caproates and enanthates were obtained.

EXAMPLE XIII

A mixture of 1 gram of B-homo-17α-methyl-19-nor-$\Delta^{5(10)}$-androstene-3β,17β-diol, 1 gram of p-toluenesulfonic acid monohydrate, 50 cc. of acetic acid and 25 cc. of acetic anhydride was allowed to stand at room temperature for 24 hours. Following this reaction period the reaction mixture was poured into water and stirred until the excess acetic anhydride had hydrolyzed. Next, the product was isolated by extraction with methylene dichloride, and the extract was washed with water until neutral, then dried over anhydrous sodium sulfate and evaporated to dryness. Crystallization of the residue from acetone/diethyl ether gave B-homo-17α-methyl-19-nor-$\Delta^{5(10)}$-androstene-3β,17β-diol 3,17-diacetate.

This procedure was then repeated in every detail but one, namely, B-homo-17α-methyl-19-nor-$\Delta^{5(10)}$-androstene-3β,17β-diol was replaced by B-homo-19-nor-17α-vinyl-$\Delta^{5(10)}$-androstene-3β,17β-diol
B-homo-17α-ethynyl-19-nor-$\Delta^{5(10)}$-androstene-3β,17β-diol;
B-homo-17α-fluoroethynyl-19-nor-$\Delta^{5(10)}$-androstene-3β,17β-diol;
B-homo,17α-chloroethynyl-19-nor-$\Delta^{5(10)}$-androstene-3β,17β-diol;
B-homo-17α-bromoethynyl-19-nor-$\Delta^{5(10)}$-androstene-3β,17β-diol;
B-homo-17α-trifluoropropynyl-19-nor-$\Delta^{5(10)}$-androstene-3β,17β-diol;
B-homo-17α-methyl-19-nor-$\Delta^{5(10)}$-androstene-3β-17β-diol 3-acetate;
B-homo-19-nor-17α-vinyl-$\Delta^{5(10)}$-androstene-3β,17β-diol; 3-propionate;
B-homo-17α-ethynyl-19-nor-$\Delta^{5(10)}$-androstene-3β,17β-diol 3-cyclopentyl-propionate;
B-homo-17α-fluoroethynyl-19-nor-$\Delta^{5(10)}$-androstene-3β,17β-diol 3-β-chloropropionate;
B-homo-17α-chloroethynyl-19-nor-$\Delta^{5(10)}$-androstene-3β,17β-diol 3-butyrate;
B-homo-17α-bromoethynyl-19-nor-$\Delta^{5(10)}$-androstene-3β,17β-diol 3-caproate, and
B-homo-17α-trifluoropropynyl-19-nor-$\Delta^{5(10)}$-androstene-3β,17β-diol 3-enanthate, respectively. In each case, the corresponding 3,17-diester, namely, B-homo-19-nor-17α-vinyl-$\Delta^{5(10)}$-androstene-3β,17β-diol 3,17-diacetate;
B-homo-17α-ethynyl-19-nor-$\Delta^{5(10)}$-androstene-3β,17β-diol 3,17-diacetate;
B-homo-17α-fluoroethynyl-19-nor-$\Delta^{5(10)}$-androstene-3β,17β-diol 3,17-diacetate;
B-homo-17α-chloroethynyl-19-nor-$\Delta^{5(10)}$-androstene-3β,17β-diol 3,17-diacetate;
B-homo-17α-bromoethynyl-19-nor-$\Delta^{5(10)}$-androstene-3β,17β-diol 3,17-diacetate;
B-homo-17α-trifluoropropynyl-19-nor-$\Delta^{5(10)}$-androstene-3β,17β-diol 3,17-diacetate;

B-homo-17α-methyl-19-nor-$\Delta^{5(10)}$-androstene-3β,17β-diol 3,17-diacetate (identical to that prepared as described hereinabove);

B-homo-19-nor-17α-vinyl-$\Delta^{5(10)}$-androstene-3β,17β-diol 3-propionate 17-acetate;
B-homo-17α-ethynyl-19-nor-$\Delta^{5(10)}$-androstene-3β,17β-diol 3-cyclopentylpropionate 17-acetate;
B-homo-17α-fluoroethynyl-19-nor-$\Delta^{5(10)}$-androstene-3β,17β-diol 3-β-chloropropionate 17-acetate;
B-homo-17α-chloroethynyl-19-nor-$\Delta^{5(10)}$androstene-3β,17β-diol 3-butyrate 17-acetate;
B-homo-17α-bromoethynyl-19-nor-$\Delta^{5(10)}$-androstene-3β,17β-diol 3-caproate 17-acetate, and
B-homo-17α-trifluoropropynyl-19-nor-$\Delta^{5(10)}$-androstene-3β,17β-diol 3-enanthate 17-acetate;

respectively was obtained.

EXAMPLE XIV

A solution of 1 gram of B-homo-17α-methyl-19-nor-$\Delta^{5(10)}$androstene-3β,17β-diol 3,17-diacetate in 50 cc. of methanol was refluxed for 3 hours with 500 mg. of potassium hydroxide dissolved in 1 cc. of water. Following this reaction period the reaction mixture was poured into ice water and the thus-formed precipitate collected by filtration, washed with water until neutral and then dried. Recrystallization from methylene dichloride/diethyl ether gave B-homo-17α-methyl-19-nor-$\Delta^{5(10)}$-androstene-3β,17β-diol 17-acetate.

By repeating this procedure in every detail but one, namely, replacing B-homo-17α-methyl-19-nor-$\Delta^{5(10)}$-androstene-3β,17β-diol 3,17-diacetate with:

B-homo-19-nor-17α-vinyl-$\Delta^{5(10)}$-androstene-3β,17β-diol 3,17-diacetate;
B-homo-17α-ethynyl-19-nor-$\Delta^{5(10)}$-androstene-3β,17β-diol 3,17-diacetate;
B-homo-17α-fluoroethynyl-19-nor-$\Delta^{5(10)}$-androstene-3β,17β-diol 3,17-diacetate;
B-homo-17α-chloroethynyl-19-nor-$\Delta^{5(10)}$-androstene-3β,17β-diol 3,17-diacetate;
B-homo-17α-bromoethynyl-19-nor-$\Delta^{5(10)}$-androstene-3β,17β-diol 3,17-diacetate, and
B-homo-17α-trifluoropropynyl-19-nor-$\Delta^{5(10)}$-androstene-3β,17β-diol 3,17-diacetate, respectively, the corresponding 17-monoacetates were obtained.

EXAMPLE XV

To a solution of 1 gram of B-homo-19-nor-$\Delta^{5(10)}$-androsten-3β-ol-17-one in 25 cc. of benzene there was added 4 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was chromatographed by passing it, dissolved in hexane, through a column of neutral alumina, thus giving B-homo-3β-tetrahydropyranyloxy-19-nor-$\Delta^{5(10)}$-androsten-17-one.

This procedure was then repeated in every detail but one, namely, B-homo-19-nor-$\Delta^{5(10)}$-androsten-3β-ol-17-one was replaced by:

B-homo-19-nor-$\Delta^{5(10)}$-androstene-3β,17β-diol;
B-homo-17α-methyl-19-nor-$\Delta^{5(10)}$-androstene-3β,17β-diol;
B-homo-17α-methyl-19-nor-$\Delta^{5(10)}$-androstene-3β,17β-diol 3-acetate;
B-homo-17α-methyl-19-nor-$\Delta^{5(10)}$-androstene-3β,17β-diol 17-acetate;
B-homo-19-nor-17α-vinyl-$\Delta^{5(10)}$-androstene-3β,17β-diol;
B-homo-19-nor-17α-vinyl-$\Delta^{5(10)}$-androstene-3β,17β-diol 3-acetate;
B-homo-19-nor-17α-vinyl-$\Delta^{5(10)}$-androstene-3β,17β-diol 17-acetate;
B-homo-17α-ethynyl-19-nor-$\Delta^{5(10)}$-androstene-3β,17β-diol;
B-homo-17α-ethynyl-19-nor-$\Delta^{5(10)}$-androstene-3β,17β-diol 3-acetate;
B-homo-17α-ethynyl-19-nor-$\Delta^{5(10)}$-androstene-3β,17β-diol 17-acetate;
B-homo-17α-fluoroethynyl-19-nor-$\Delta^{5(10)}$-androstene-3β,17β-diol;
B-homo-17α-fluoroethynyl-19-nor-$\Delta^{5(10)}$-androstene-3β,17β-diol 3-acetate;
B-homo-17α-fluoroethynyl-19-nor-$\Delta^{5(10)}$-androstene-3β,17β-diol 17-acetate;
B-homo-17α-chloroethynyl-19-nor-$\Delta^{5(10)}$-androstene-3β,17β-diol;
B-homo-17α-chloroethynyl-19-nor-$\Delta^{5(10)}$-androstene-3β,17β-diol 3-acetate;
B-homo-17α-chloroethynyl-19-nor-$\Delta^{5(10)}$-androstene-3β,17β-diol 17-acetate;
B-homo-17α-bromoethynyl-19-nor-$\Delta^{5(10)}$-androstene-3β,17β-diol;
B-homo-17α-bromoethynyl-19-nor-$\Delta^{5(10)}$-androstene-3β,17β-diol 3-acetate;
B-homo-17α-bromoethynyl-19-nor-$\Delta^{5(10)}$-androstene-3β,17β-diol 17-acetate;
B-homo-17α-trifluoropropynyl-19-nor-$\Delta^{5(10)}$-androstene-3β,17β-diol;
B-homo-17α-trifluoropropynyl-19-nor-$\Delta^{5(10)}$-androstene-3β-17β-diol 3-acetate, and
B-homo-17α-trifluoropropynyl-19-nor-$\Delta^{5(10)}$-androstene-3β,17β-diol 17-acetate, respectively; the corresponding tetrahydropyranyl ethers, namely, B-homo-3β,17β-bis(tetrahydropyranyloxy)-19-nor-$\Delta^{5(10)}$-androstene;
B-homo-3β,17β-bis(tetrahydropyranyloxy)-17α-methyl-19-nor-$\Delta^{5(10)}$-androstene;
B-homo-17α-methyl-17β-tetrahydropyranyloxy-19-nor-$\Delta^{5(10)}$-androsten-3β-ol 3-acetate;
B-homo-3β-tetrahydropyranyloxy-17α-methyl-19-nor-$\Delta^{5(10)}$-androsten-17β-ol 17-acetate;
B-homo-3β,17β-bis(tetrahydropyranyloxy)-19-nor-17α-vinyl-$\Delta^{5(10)}$-androstene;
B-homo-19-nor-17β-tetrahydropyranyloxy-17α-vinyl-$\Delta^{5(10)}$-androsten-3β-ol 3-acetate;
B-homo-3β-tetrahydropyranyloxy-19-nor-17α-vinyl-$\Delta^{5(10)}$-androsten-17β-ol 17-acetate;
B-homo-3β,17β-bis(tetrahydropyranyloxy)-17α-ethynyl-19-nor-$\Delta^{5(10)}$-androstene;
B-homo-17α-ethynyl-17β-tetrahydropyranyloxy-19-nor-$\Delta^{5(10)}$-androsten-3β-ol 3-acetate;
B-homo-3β-tetrahydropyranyloxy-17α-ethynyl-19-nor-$\Delta^{5(10)}$-androsten-17β-ol 17-acetate;
B-homo-3β,17β-bis(tetrahydropyranyloxy)-17α-fluoroethynyl-19-nor-$\Delta^{5(10)}$-androstene;
B-homo-17α-fluoroethynyl-17β-tetrahydropyranyloxy-19-nor-$\Delta^{5(10)}$-androsten-3β-ol 3-acetate;
B-homo-3β-tetrahydropyranyloxy-17α-fluoroethynyl-19-nor-$\Delta^{5(10)}$-androsten-17β-ol 17-acetate;
B-homo-3β,17β-bis(tetrahydropyranyloxy)-17α-chloroethynyl-19-nor-$\Delta^{5(10)}$-androstene;
B-homo-17α-chloroethynyl-17β-tetrahydropyranyloxy-19-nor-$\Delta^{5(10)}$-androsten-3β-ol 3-actate;
B-homo-3β-tetrahydropyranyloxy-17α-chloroethynyl-19-nor-$\Delta^{5(10)}$-androsten-17β-ol 17-acetate;
B-homo-3β,17β-bis(tetrahydropyranyloxy)-17α-bromoethynyl-19-nor-$\Delta^{5(10)}$-androstene;
B-homo-17α-bromoethynyl-17β-tetrahydropyranyloxy-19-nor-$\Delta^{5(10)}$-androsten-3β-ol 3-acetate;
B-homo-3β-tetrahydropyranyloxy-17α-bromoethynyl-19-nor-$\Delta^{5(10)}$-androsten-17β-ol 17-acetate;
B-homo-3β,17β-bis(tetrahydropyranyloxy)-17α-trifluoropropynyl-19-nor-$\Delta^{5(10)}$-androstene;
B-homo-17α-trifluoropropynyl-17β-tetrahydropyranyloxy-19-nor-$\Delta^{5(10)}$-androsten-3β-ol 3-acetate, and
B-homo-3β-tetrahydropyranyloxy-17α-trifluoropropynyl-19-nor-$\Delta^{5(10)}$-androsten-17β-ol 17-acetate, respectively, were obtained.

Similarly, by replacing dihydropyran with dihydrofuran, the corresponding tetrahydrofuranyloxy ethers were obtained.

EXAMPLE XVI

By treating B-homo-3β-tetrahydropyranyloxy-19-nor-$\Delta^{5(10)}$-androsten-17-one in the manner described in Example VII hereinabove, B-homo-3β-tetrahydropyranyloxy-19-nor-$\Delta^{5(10)}$-androsten-17β-ol was obtained.

Reaction of this 17β-ol with acetic anhydride in pyridine in the manner described in Example XII hereinabove gave B-homo-3β-tetrahydropyranyloxy-19-nor-$\Delta^{5(10)}$-androsten-17β-ol 17-acetate.

A solution of 1 gram of this 17-acetate in 80 cc. of methanol was then admixed with 1 gram of oxalic acid in 20 cc. of water, and the resulting reaction mixture was refluxed for 1 hour. Following this reaction period the reaction mixture was concentrated to about 20 cc. under vacuum, then poured into ice water. The resulting precipitate was collected by filtration, washed with water until neutral, then dried. Recrystallization of the dry precipitate from acetone/hexane gave B-homo-19-nor-$\Delta^{5(10)}$-androstene-3β,17β-diol 17-acetate.

EXAMPLE XVII

B-homo-19-nor-$\Delta^{5(10)}$-androsten-3β-ol-17-one 3-acetate, obtained as described in Example V hereinabove, was reacted with sodium borohydride in aqueous tetrahydrofuran in the manner described in Example VII hereinabove to give B-homo-19-nor-$\Delta^{5(10)}$-androstene-3β,17β-diol 3-acetate.

Reaction of this free 17β-ol with dihydropyran in the manner described in Example XV hereinabove gave B-homo-17β-tetrahydropyranyloxy-19-nor-$\Delta^{5(10)}$-androsten-3β-ol-3-acetate.

Hydrolysis of this 3-acetate with aqueous methanolic potassium hydroxide in the manner described in Example VI hereinabove gave B-homo-17β-tetrahydropyranyloxy-19-nor-$\Delta^{5(10)}$-androsten-3β-ol.

Oxidation of the 3β-hydroxyl group in this free 3β-ol with chromium trioxide in pyridine, in the manner described in Example II hereinabove, gave B-homo-17β-tetrahydropyranyloxy-19-nor-$\Delta^{5(10)}$-androsten-3-one.

A solution of 1 gram of the thus-obtained 3-one in 10 cc. of methanol was then admixed with 10 cc. of an aqueous 0.1 N solution of potassium hydroxide, and the resulting reaction mixture, maintained under an inert nitrogen atmosphere, was refluxed for 1 hour. Following this reaction period the reaction mixture was poured into ice water, and the resulting precipitate collected by filtration, washed with water until neutral and then dried. Recrystallization from methylene dichloride/diethyl ether gave B-homo-17β-tetrahydropyranyloxy-19-nor-$\Delta^4$-androsten-3-one.

EXAMPLE XVIII

A solution of 1 gram of B-homo-17β-tetrahydropyranyloxy-19-nor-Δ⁴-androsten-3-one in 50 cc. of anhydrous tetrahydrofuran was added over a 30 minute period to a stirred suspension of 1 gram of lithium aluminum hydride in 50 cc. of anhydrous tetrahydrofuran, and the resulting reaction mixture was then refluxed for 2 hours. Following this reaction period the reaction mixture was cooled to room temperature then cautiously treated with 5 cc. of ethyl acetate and 2 cc. of water. Next, solid sodium sulfate was added, and the inorganic material filtered off and washed thoroughly with hot ethyl acetate, with the washings being added to the filtrate. The combined organic solution was then evaporated to dryness. Crystallization of the dry residue from acetone/hexane gave B-homo-17β-tetrahydropyranyloxy-19-nor-Δ⁴-androsten-3β-ol.

EXAMPLE XIX

Esterification of B-homo-17β-tetrahydropyranyloxy-19-nor-Δ⁴-androsten-3β-ol with acetic anhydride in pyridine in the manner described in Example XII hereinabove gave B-homo-17β-tetrahydropyranyloxy-19-nor - Δ⁴-androsten-3β-ol 3-acetate.

Removal of the tetrahydropyranyl group from this 3-acetate in the manner described in Example XVI hereinabove gave B-homo-19-nor-Δ⁴-androstene-3β,17β-diol 3-acetate.

Oxidation of the 17β-hydroxyl group in this free 17β-ol with chromium trioxide in pyridine, in the manner described in Example II hereinabove, gave B-homo-19-nor-Δ⁴-androsten-3β-ol-17-one 3 acetate.

Hydrolysis of this 3-acetate with aqueous methanolic potassium hydroxide in the manner described in Example VI hereinabove gave B-homo-19-nor-Δ⁴-androsten-3β-ol-17-one.

Hydrolysis of B-homo-19-nor-Δ⁴-androstene-3β,17β-diol 3-acetate in the same manner gave B-homo-19-nor-Δ⁴-androstene-3β,17β-diol.

By reacting B-homo-19-nor-Δ⁴-androsten-3β-ol-17-one with methylmagnesium bromide in the manner described in Example VIII hereinabove, B-homo-17αmethyl-19-nor-Δ⁴-androstene-3β,17β-diol was obtained.

Similarly, reaction of the 17-one with acetylene in the presence of potassium t-amylate in the manner described in Example IX hereinabove gave B-homo-17α-ethynyl-19-nor-Δ⁴-androstene-3β,17β-diol.

Hydrogenation of the thus-obtained 17α-ethynyl derivative in the manner described in Example X hereinabove gave B-homo-19-nor-17α-vinyl₅Δ⁴-androstene-3β,17β-diol.

By reacting 1-chloro-2-fluoroethylene with methyl lithium, and then adding B-homo-19-nor-Δ⁴-androsten-3β-ol-17-one, in the manner described in Example XI hereinabove, B-homo-17α-fluoroethynyl-19-nor-Δ⁴-androstene-3β,17β-diol was obtained.

Similarly, by carrying out the same reaction using 1,2-dichloroethylene, 1,2-dibromoethylene and 1-chloro-3,3,3-trifluoropropyl-1-ene, respectively, in place of 1-chloro-2-fluoroethylene, B-homo-17α-chloroethynyl-19-nor-Δ⁴-androstene-3β,17β-diol; B-homo-17α-bromoethynyl-19-nor-Δ⁴-androstene-3β,17β-diol and B-homo-17α-trifluoropropynyl-19-nor-Δ⁴-androstene-3β,17β-diol, respectively, were obtained.

EXAMPLE XX

B-homo-19-nor-Δ⁴-androsten-3β-ol-17-one was esterified, using acetic anhydride in pyridine in the manner described in Example XII hereinabove, to give B-homo-19-nor-Δ⁴-androsten-3β-ol-17-one 3-acetate, identical to that prepared as described in Example XIX hereinabove.

By carrying out this reaction using:

B-homo-19-nor-nor-Δ⁴-androstene-3β,17β-diol;
B-homo-17α-methyl-19-nor-Δ⁴-androstene-3β,17β-diol;
B-homo-19-nor-17α-vinyl-Δ⁴-androstene-3β,17β-diol;
B-homo-17α-ethynyl-19-nor-Δ⁴-androstene-3β,17β-diol;
B-homo-17α-fluoroethynyl-19-nor-Δ⁴-androstene-3β,17β-diol;
B-homo-17α-bromoethynyl-19-nor-Δ⁴-androstene-3β,17β-diol;
B-homo-17α-fluoroethynyl-19-nor-Δ⁴-androstene-3β,17β-diol, and
B-homo-17α-trifluoropropynyl-19nor-Δ⁴-androstene-3β,17β-diol, respectively, in place of B-homo-19-nor-Δ⁴-androsten-3β-ol-17-one, the corresponding 3-acetates (and, in the case of B-homo-19-nor-Δ⁴-androstene-3β,17β-diol, the corresponding 3,17-diacetate) were obtained.

Similarly, by replacing acetic anhydride with propionic anhydride; cyclopentylpropionic anhydride, β-chloropropionic anhydride, butyric anhydride, caproic anhydride and enanthic anhydride, and using in turn each of the nine B-homo steroids mentioned above, the corresponding propionates, cyclopentylpropionates, B-chloropropionates, butyrates, caproates and enanthates were obtained.

EXAMPLE XXI

B-homo-17α-methyl - 19 - nor - Δ⁴ - androstene-3β,17β-diol was esterified, using a mixture of acetic anhydride and acetic acid in the presence of p-toluenesulfonic acid in the manner described in Example XIII hereinabove, to give B-homo-17α-methyl-19-nor - Δ⁴ - androstene-3β,17β-diol 3,17-diacetate.

By carrying out this reaction using:

B-homo-19-nor-17α-vinyl-Δ⁴-androstene-3β,17β-diol;
B-homo-17α-ethynyl-19-nor-Δ⁴-androstene-3β,17β-diol;
B-homo-17α-fluoroethynyl-19-nor-Δ⁴-androstene-3β,17β-diol;
B-homo-17α-chloroethynyl-19-nor-Δ⁴-androstene-3β,17β-diol;
B-homo-17α-bromoethynyl-19-nor-Δ⁴-androstene-3β,17β-diol;
B-homo-17α-trifluoropropynyl-19-nor-Δ⁴-androstene-3β,17β-diol;
B-homo-17α-methyl-19-nor-Δ⁴-androstene-3β,17β-diol 3-acetate;
B-homo-19-nor-17α-vinyl-Δ4-androstene-3β,17β-diol 3-propionate;
B-homo-17α-ethynyl-19-nor-Δ⁴-androstene-3β,17β-diol 3-cyclopentylpropionate;
B-homo-17α-fluoroethynyl-19-nor-Δ⁴-androstene-3β,17β-diol 3β-chloropropionate;
B-homo-17α-chloroethynyl-19-nor-Δ⁴-androstene-3β,17β-diol 3-butyrate;
B-homo-17α-bromoethynyl-19-nor-Δ⁴-androstene-3β,17β-diol 3-caproate, and
B-homo-17α-trifluoropropynyl-19-nor-Δ⁴-androstene-3β,17β-diol B-enanthate, respectively, in place of B-homo-17α-methyl-19-nor-Δ⁴-androstene-3β,17β-diol, the corresponding 3,17-diesters, namely:

B-homo-19-nor-17α-vinyl-Δ⁴-androstene-3β,17β-diol 3,17-diacetate;
B-homo-17α-ethynyl-19-nor-Δ⁴-androstene-3β,17β-diol 3,17-diacetate;
B-homo-17α-fluoroethynyl-19-nor-Δ⁴-androstene-3β,17β-diol 3,17-diacetate;
B-homo-17α-chloroethynyl-19-nor-Δ⁴-androstene-3β,17β-diol 3,17-diacetate;
B-homo-17α-bromoethynyl-19-nor-Δ⁴-androstene-3β,17β-diol 3,17-diacetate;
B-homo-17α-trifluoropropynyl-19-nor-Δ⁴-androstene-3β,17β-diol 3,17-diacetate;
B-homo-17α-methyl-19-nor-Δ⁴-androstene-3β,17β-diol 3,17-diacetate (identical to that prepared as described hereinabove);
B-homo-19-nor-17α-vinyl-Δ⁴-androstene-3β,17β-diol 3-propionate 17-acetate;

B-homo-17α-ethynyl-19-nor-Δ⁴-androstene-3β,17β-diol
3-cyclopentylpropionate 17-acetate;
B-homo-17α-fluoroethynyl-19-nor-Δ⁴-androstene-3β,17β-
diol 3β-chloropropionate 17-acetate;
B-homo-17α-chloroethynyl-19-nor-Δ⁴-androstene-3β,
17β-diol 3-butyrate 17-acetate;
B-homo-17α-bromoethynyl-19-nor-Δ⁴-androstene-3β,
17β-diol 3-caproate 17-acetate, and
B-homo-17α-trifluoropropynyl-19-nor-Δ⁴-androstene-
3β,17β-diol 3-enanthate, respectively, were obtained.

EXAMPLE XXII

B-homo-17α-methyl - 19 - nor - Δ⁴ - androstene-3β,17β-diol 3,17-diacetate was refluxed with methanolic potassium hydroxide in the manner described in Example XIV hereinabove to give B-homo-17α-methyl-19-nor-Δ⁴-androstene-3β,17β-diol 17-acetate.

By carrying out this reaction using:

B-homo-19-nor-17α-vinyl-Δ⁴-androstene-3β,17β-diol
3,17-diacetate;
B-homo-17α-ethynyl-19-nor-Δ⁴-androstene-3β,17β-diol
3,17-diacetate;
B-homo-17α-fluoroethynyl-19-nor-Δ⁴-androstene-3β,
17β-diol 3,17-diacetate;
B-homo-17α-chloroethynyl-19-nor-Δ⁴-androstene-
3β,17β-diol 3,17-diacetate;
B-homo-17α-bromoethynyl-19-nor-Δ⁴-androstene-
3β,17β-diol 3,17-diacetate, and
B-homo-17α-trifluoropropynyl-19-nor-Δ⁴-androstene-
3β,17β-diol 3,17-diacetate, respectively, the corresponding 17-monoacetates were obtained.

EXAMPLE XXIII

B-homo-19-nor - Δ⁴ - androsten - 3β - ol-17-one was etherified with dihydropyran in the manner described in Example XV hereinabove to give B-homo-3β-tetrahydropyranyloxy-19-nor-Δ⁴-androsten-17-one.

By carrying out this reaction using:

B-homo-19-nor-Δ⁴-androstene-3β,17β-diol;
B-homo-17α-methyl-19-nor-Δ⁴-androstene-3β,17β-diol;
B-homo-17α-methyl-19-nor-Δ⁴-androstene-3β,17β-diol
3-acetate;
B-homo-17α-methyl-19-nor-Δ⁴-androstene-3β,17β-diol
17-acetate;
B-homo-19-nor-17α-vinyl-Δ⁴-androstene-3β,17β-diol;
B-homo-19-nor-17α-vinyl-Δ⁴-androstene-3β,17β-diol
3-acetate;
B-homo-19-nor-17α-vinyl-Δ⁴-androstene-3β,17β-diol
17-acetate;
B-homo-17α-ethynyl-19-nor-Δ⁴-androstene-3β,17β-diol;
B-homo-17α-ethynyl-19-nor-Δ⁴-androstene-3β,17β-diol
3-acetate;
B-homo-17α-ethynyl-19-nor-Δ⁴-androstene-3β,17β-diol
17-acetate;
B-homo-17α-fluoroethynyl-19-nor-Δ⁴-androstene-3β,17β-
diol;
B-homo-17α-fluoroethynyl-19-nor-Δ⁴-androstene-3β,17β-
diol 3-acetate;
B-homo-17α-fluoroethynyl-19-nor-Δ⁴-androstene-3β,17β-
diol 17-acetate;
B-homo-17α-chloroethynyl-19-nor-Δ⁴-androstene-3β,17β-
diol;
B-homo-17α-chloroethynyl-19-nor-Δ⁴-androstene-3β,17β-
diol 3-acetate;
B-homo-17α-chloroethynyl-19-nor-Δ⁴-androstene-
3β,17β-diol 17-acetate;
B-homo-17α-bromoethynyl-19-nor-Δ⁴-androstene-
3β,17β-diol;
B-homo-17α-bromoethynyl-19-nor-Δ⁴-androstene-
3β,17β-diol 3-acetate;
B-homo-17α-bromoethynyl-19-nor-Δ⁴-androstene-
3β,17β-diol 17-acetate;
B-homo-17α-trifluoropropynyl-19-nor-Δ⁴-androstene-
3β,17β-diol;
B-homo-17α-trifluoropropynyl-19-nor-Δ⁴-androstene-
3β,17β-diol 3-acetate, and
B-homo-17α-trifluoropropynyl-19-nor-Δ⁴-androstene-
3β,17β-diol 17-acetate, respectively, in place of B-homo-19-nor-Δ⁴-androstene-3β-ol-17-one, the corresponding tetrahydropyranyl ethers, namely, B-homo-3β,17β-bis(tetrahydropyranyloxy)-19-nor-Δ⁴-
androstene;
B-homo-3β,17β-bis(tetrahydropyranyloxy)-17α-methyl-
19-nor-Δ⁴-androstene;
B-homo-17α-methyl-17β-tetrahydropyranyloxy-19-nor-
Δ⁴-androsten-3β-ol 3-acetate;
B-homo-3β-tetrahydropyranyloxy-17α-methyl-19-nor-
Δ⁴-androsten-17β-ol 17-acetate;
B-homo-3β,17β-bis(tetrahydropyranyloxy)-19-nor-17α-
vinyl-Δ⁴-androstene;
B-homo-19-nor-17β-tetrahydropyranyloxy-17α-vinyl-
Δ⁴-androsten-3β-ol 3-acetate;
B-homo-3β-tetrahydropyranyloxy-19-nor-17α-vinyl-
Δ⁴-androsten-17β-ol 17-acetate;
B-homo-3β,17β-bis(tetrahydropyranyloxy)-17α-ethynyl-
19-nor-Δ⁴-androstene;
B-homo-17α-ethynyl-17β-tetrahydropyranyloxy-19-nor-
Δ⁴-androsten-3β-ol 3-acetate;
B-homo-3β-tetrahydropyranyloxy-17α-ethynyl-19-nor-
Δ⁴-androsten-17β-ol 17-acetate;
B-homo-3β,17β-bis(tetrahydropyranyloxy)-17α-fluoro-
ethynyl-19-nor-Δ⁴-androstene;
B-homo-17α-fluoroethynyl-17β-tetrahydropyranyloxy-19-
nor-Δ⁴-androsten-3β-ol 3-acetate;
B-homo-3β-tetrahydropyranyloxy-17α-fluoroethynyl-19-
nor-Δ⁴-androsten-17β-ol 17-acetate;
B-homo-3β,17β-bis(tetrahydropyranyloxy)-17α-chloro-
ethynyl-19-nor-Δ⁴-androstene;
B-homo-17α-chloroethynyl-17β-tetrahydropyranyloxy-19-
nor-Δ⁴-androsten-3β-ol 3-acetate;
B-homo-3β-tetrahydropyranyloxy-17α-chloroethynyl-19-
nor-Δ⁴-androsten-17β-ol 17-acetate;
B-homo-3β,17β-bis(tetrahydropyranyloxy)-17α-bromo-
ethynyl-19-nor-Δ⁴-androstene;
B-homo-17α-bromoethynyl-17β-tetrahydropyranyloxy-
19-nor-Δ⁴-androsten-3β-ol 3-acetate;
B-homo-3β-tetrahydropyranyloxy-17α-bromoethynyl-19-
nor-Δ⁴-androsten-17β-ol 17-acetate;
B-homo-3β,17β-bis(tetrahydropyranyloxy)-17α-trifluoro-
propynyl-19-nor-Δ⁴-androstene;
B-homo-17α-trifluoropropynyl-17β-tetrahydropyranyloxy-
19-nor-Δ⁴-androsten-3β-ol 3-acetate, and
B-homo-3β-tetrahydropyranyloxy-17α-trifluoropropynyl-
19-nor-Δ⁴-androsten-17β-ol 17-acetate, respectively, were obtained.

Similarly, by replacing dihydropyran with dihydrofuran, the corresponding tetrahydrofuranyl ethers were obtained.

EXAMPLE XXIV

By treating B-homo-3β-tetrahydropyranyloxy - 19-nor-Δ⁴-androsten-17-one in the manner described in Example VII hereinabove, B-homo - 3β - tetrahydropyranyloxy-19-nor-Δ⁴-androsten-17β-ol was obtained.

Reaction of this 17β-ol with acetic anhydride in pyridine in the manner described in Example XII hereinabove gave B-homo-3β-tetrahydropyranyloxy - 19 - nor-Δ⁴-androsten-17β-ol 17-acetate.

Hydrolysis of the 3β-tetrahydropyranyloxy group in this 17-acetate in the manner described in Example XVI hereinabove gave B-homo-19-nor - Δ⁴ - androstene-3β, 17β-diol 17-acetate.

It will be obvious to those skilled in the art that other changes and variations can be made in carrying out the present invention without departing from the spirit and scope thereof as defined in the appended claims.

I claim:

1. A compound represented by the general formula:

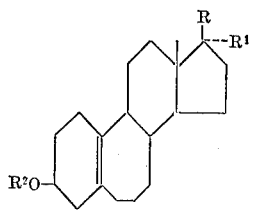

wherein R is selected from the group consisting of the hydroxyl group, hydrocarbon carboxylic acyloxy groups containing less than 12 carbon atoms, the tetrahydrofuranyloxy group and the tetrahydropyranyloxy group; $R^1$ is selected from the group consisting of hydrogen, lower alkyl groups, lower alkenyl groups and lower alkynyl groups; R and $R^1$ taken together represent the keto group, and $R^2$ is selected from the group consisting of hydrogen, hydrocarbon carboxylic acyl groups containing less than 12 carbon atoms, the tetrahydrofuranyl group and the tetrahydropyranyl group.

2. B-homo-19-nor-$\Delta^{5(10)}$-androsten-3$\beta$-ol-17-one.
3. B-homo-19-nor-$\Delta^{5(10)}$-androstene-3$\beta$,17$\beta$-diol.
4. B - homo - 17$\alpha$ - methyl - 19 - nor - $\Delta^{5(10)}$ - androstene-3$\beta$,17$\beta$-diol.
5. B - homo - 19 - nor - 17$\alpha$ - vinyl - $\Delta^{5(10)}$ - androstene-3$\beta$,17$\beta$-diol.
6. B - homo - 17$\alpha$ - ethynyl - 19 - nor - $\Delta^{5(10)}$ - androstene-3$\beta$,17$\beta$-diol.
7. B - homo - 17$\alpha$ - fluoroethynyl - 19 - nor - $\Delta^{5(10)}$-androstene-3$\beta$,17$\beta$-diol.
8. B - homo - 17$\alpha$ - chloroethynyl - 19 - nor - $\Delta^{5(10)}$-androstene-3$\beta$,17$\beta$-diol.
9. B - homo - 17$\alpha$ - bromoethynyl - 19 - nor - $\Delta^{5(10)}$-androstene-3$\beta$,17$\beta$-diol.
10. B - homo - 17$\alpha$ - trifluoropropynyl - 19 - nor - $\Delta^{5(10)}$-androstene-3$\beta$,17$\beta$-diol.

11. A compound represented by the general formula:

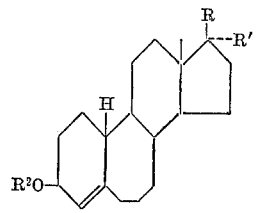

wherein R is selected from the group consisting of the hydroxyl group, hydrocarbon carboxylic acyloxy groups containing less than 12 carbon atoms, the tetrahydrofuranyloxy group and the tetrahydropyranyloxy group; $R^1$ is selected from the group consisting of hydrogen, lower alkyl group, lower alkenyl groups and lower alkynyl groups; R and $R^1$ taken together represent the keto group, and $R^2$ is selected from the group consisting of hydrogen, hydrocarbon carboxylic acyl groups containing less than 12 carbon atoms, the tetrahydrofuranyl group and the tetrahydropyranyl group.

12. B-homo-19-nor-$\Delta^4$-androsten-3$\beta$-ol-17-one.
13. B-homo-19-nor-$\Delta^4$-androstene-3$\beta$,17$\beta$-diol.
14. B - homo - 17$a$ - methyl - 19 - nor - $\Delta^4$ - androstene-3$\beta$,17$\beta$-diol.
15. B - homo - 19 - nor - 17$\alpha$ - vinyl - $\Delta^4$ - androstene-3$\beta$,17$\beta$-diol.
16. B - homo - 17$\alpha$ - ethynyl - 19 - nor - $\Delta^4$ - androstene-3$\beta$,17$\beta$-diol.
17. B - homo - 17$\alpha$ - fluoroethynyl - 19 - nor - $\Delta^4$ - androstene-3$\beta$,17$\beta$-diol.
18. B - homo - 17$\alpha$ - chloroethynyl - 19 - nor - $\Delta^4$ - androstene-3$\beta$,17$\beta$-diol.
19. B - homo - 17$\alpha$ - bromoethynyl - 19 - nor - $\Delta^4$-androstene-3$\beta$,17$\beta$-diol.
20. B - homo - 17$\alpha$ - trifluoropropynyl - 19 - nor - $\Delta^4$-androstene-3$\beta$,17$\beta$-diol.

References Cited

UNITED STATES PATENTS

| | | | |
|---|---|---|---|
| 3,291,836 | 12/1966 | Tadanier et al. | 260—586 |
| 3,234,269 | 2/1966 | Jeger et al. | 260—586 |
| 3,059,019 | 10/1962 | Ringold | 260—586 |

LEON ZITVER, *Primary Examiner.*

M. JACOB, *Assistant Examiner.*

UNITED STATES PATENT OFFICE
CERTIFICATE OF CORRECTION

Patent No. 3,410,907                          November 12, 1968

John A. Edwards

It is certified that error appears in the above identified patent and that said Letters Patent are hereby corrected as shown below:

Column 2, formulas I, II and III should appear as shown below:

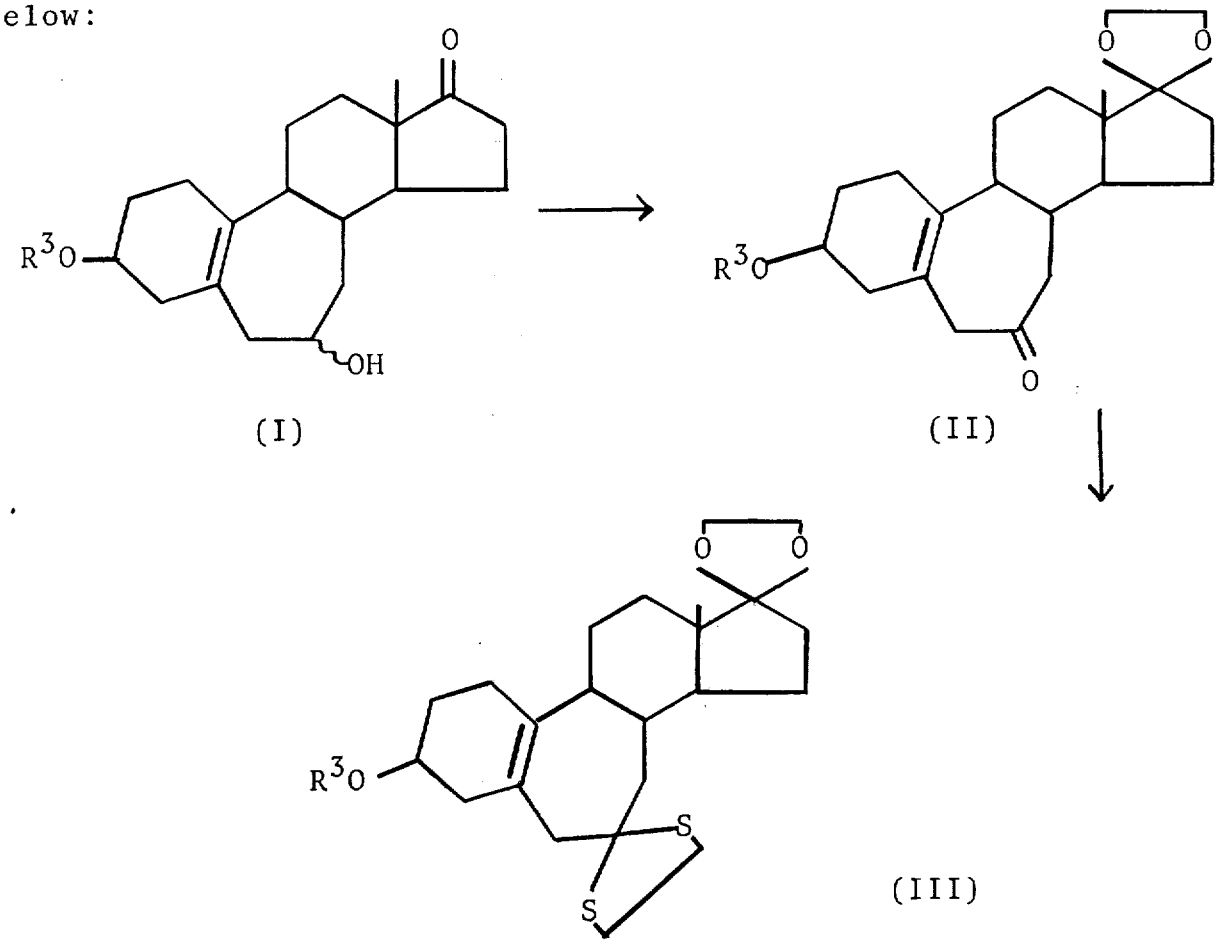

Column 3, line 61, "1-position" should read -- 17-position --.
Column 4, formula X should appear as shown below:

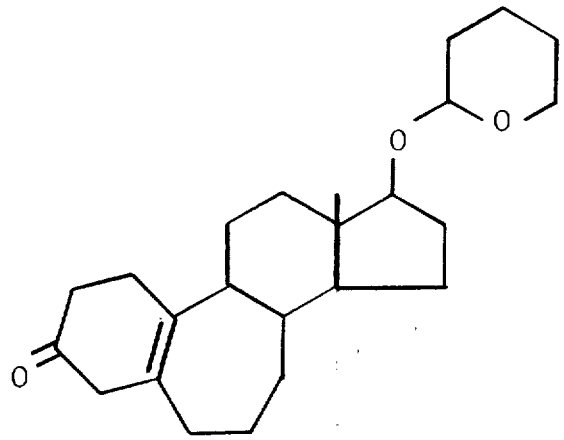

Column 6, line 15, "XVI" should read -- XIV --. Column 8, line 16, "ethylnyl" should read -- ethynyl --. Column 13, line 50, "vinyl$_5\Delta^4$" should read -- vinyl-$\Delta^4$ --; line 72, "nor-nor" should read -- nor --. Column 14, line 3, "bromoethynyl" should read -- chloroethynyl --; line 5, "fluoroethynyl" should read -- bromoethynyl --; line 42, "Δ4" should read -- $\Delta^4$ --.

Signed and sealed this 10th day of March 1970.

(SEAL)
Attest:

EDWARD M. FLETCHER, JR.
Attesting Officer

WILLIAM E. SCHUYLER, JR.
Commissioner of Patents